United States Patent
Ojha et al.

(10) Patent No.: US 9,830,365 B1
(45) Date of Patent: *Nov. 28, 2017

(54) DETERMINING INFLUENCE ACROSS SOCIAL NETWORKS

(71) Applicant: INTUIT INC., Mountain View, CA (US)

(72) Inventors: Preetam K. Ojha, Boston, MA (US); Dharin L. Nanavati, East Brunswick, NJ (US); Wade P. Fuller, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/142,624

(22) Filed: Apr. 29, 2016

Related U.S. Application Data

(63) Continuation of application No. 14/074,308, filed on Nov. 7, 2013, now Pat. No. 9,342,624.

(51) Int. Cl.
*G06F 17/30* (2006.01)
*G06Q 50/00* (2012.01)
*G06N 99/00* (2010.01)

(52) U.S. Cl.
CPC .... *G06F 17/3053* (2013.01); *G06F 17/30958* (2013.01); *G06N 99/005* (2013.01); *G06Q 50/01* (2013.01)

(58) Field of Classification Search
USPC ........................ 707/687, 736, 748, 758, 798
See application file for complete search history.

(56) References Cited

U.S. PATENT DOCUMENTS

| | | | |
|---|---|---|---|
| 8,443,005 B1 * | 5/2013 | Goldman | G06Q 50/01 707/798 |
| 2015/0026192 A1 * | 1/2015 | Kamerman | G06F 17/30699 707/748 |

* cited by examiner

*Primary Examiner* — Sana Al Hashemi
(74) *Attorney, Agent, or Firm* — Patterson + Sheridan, LLP

(57) ABSTRACT

The disclosed embodiments provide a system that facilitates user interaction. During operation, the system obtains user data for a first user and a second user connected to the first user in a social network. Next, the system uses the user data to calculate one or more influence scores between the first and second users. The system then constructs an influence graph of a set of users comprising the first and second users by creating a first node representing the first user, creating a second node representing the second user, and using the one or more influence scores as edge weights of directed edges between the first and second nodes. Finally, the system uses the influence graph to facilitate interaction among the users.

17 Claims, 5 Drawing Sheets

DETERMINING INFLUENCE ACROSS SOCIAL NETWORKS

CROSS-REFERENCE TO RELATED APPLICATIONS

This application is a continuation application of U.S. patent application Ser. No. 14/074,308, filed Nov. 7, 2013, herein incorporated by reference.

RELATED ART

The disclosed embodiments relate to social networks. More specifically, the disclosed embodiments relate to techniques for determining influence across social networks.

Social networks may be social structures containing nodes representing individuals and/or organizations, as well as links between pairs of nodes. The links may represent different types of relationships and/or levels of social familiarity, including those of friends, acquaintances, family members, and/or professional contacts. Social networks may also be tracked and maintained on web-based social networking services, which allow the individuals and/or organizations to share ideas, pictures, posts, activities, events, and/or interests with one another.

To use a social networking service, a user may create a profile containing basic, identifying, and/or demographic information for the user. For example, the social networking service may allow the user to provide a name, profile photo, location, contact information, and/or other information that may be used to identify and/or describe the user. The user may also establish connections and/or relationships with other users in the social networking service. For example, the user may add another user as a "friend" if both the user and the other user approve the "friend" connection in the social networking service. Along the same lines, the user may use an online professional network to maintain professional connections with other users with whom the user has worked and/or is interested in collaborating on future work.

In addition, social networks may have users with varying levels of influence. For example, users with high levels of influence may include leaders, contributors, celebrities, and/or other well-connected people. In turn, such users may facilitate the spreading of messages, ideas, and/or trends across the social networks; promote products or services to other users in the social networks; and/or otherwise shape the behavior of the other users. Consequently, propagation of information across social networks may be facilitated by mechanisms for identifying and connecting with influential users in the social networks.

However, existing techniques for determining influence in social networks may be based on attributes of individual users. For example, a mechanism for determining a user's level of influence may calculate an influence score for the user based on the user's activity and/or reactions to the user's activity on one or more social networking services. Such isolated, user-based influence measurements may limit the ability to determine the effects of influence across social networks. As a result, individual influence measurements may not ensure that information from a set of influential users in a social network reaches all users in the social network.

Hence, use of social networks to propagate information may be facilitated by mechanisms for determining influence across users in the social networks.

SUMMARY

The disclosed embodiments provide a system that facilitates user interaction. During operation, the system obtains user data for a first user and a second user connected to the first user in a social network. Next, the system uses the user data to calculate one or more influence scores between the first and second users. The system then constructs an influence graph of a set of users comprising the first and second users by creating a first node representing the first user, creating a second node representing the second user, and using the one or more influence scores as edge weights of directed edges between the first and second nodes. Finally, the system uses the influence graph to facilitate interaction among the users.

In some embodiments, using the one or more influence scores to facilitate interaction between the first and second users involves identifying a path through the influence graph, and using the path to target one or more of the users on the path.

In some embodiments, using the user data to calculate one or more influence scores between the first and second users involves:

(i) creating, from the user data, a first influence vector for the first user and a second influence vector for the second user;

(ii) calculating an angle between the first and second influence vectors; and (iii) calculating the one or more influence scores based on the angle.

In some embodiments, the first and second influence vectors are activity vectors and/or profile vectors.

In some embodiments, the activity vector is associated with at least one of a topic, a share, a post, a comment, a tag, a follow, and a like.

In some embodiments, the profile vector is associated with at least one of an age, a location, an ethnicity, a language, an education, an occupation, and a family status.

In some embodiments, calculating the one or more influence scores based on the angle involves:

(i) calculating a first angle using the activity vectors;

(ii) calculating a second angle using the profile vectors; and (iii) combining the first and second angles into an influence score.

In some embodiments, calculating the one or more influence scores based on the angle further involves normalizing at least one of the first and second angles prior to combining the first and second angles into the influence score.

In some embodiments, the one or more influence scores include a first influence score representing a first level of influence of the first user on the second user and a second influence score representing a second level of influence of the second user on the first user.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
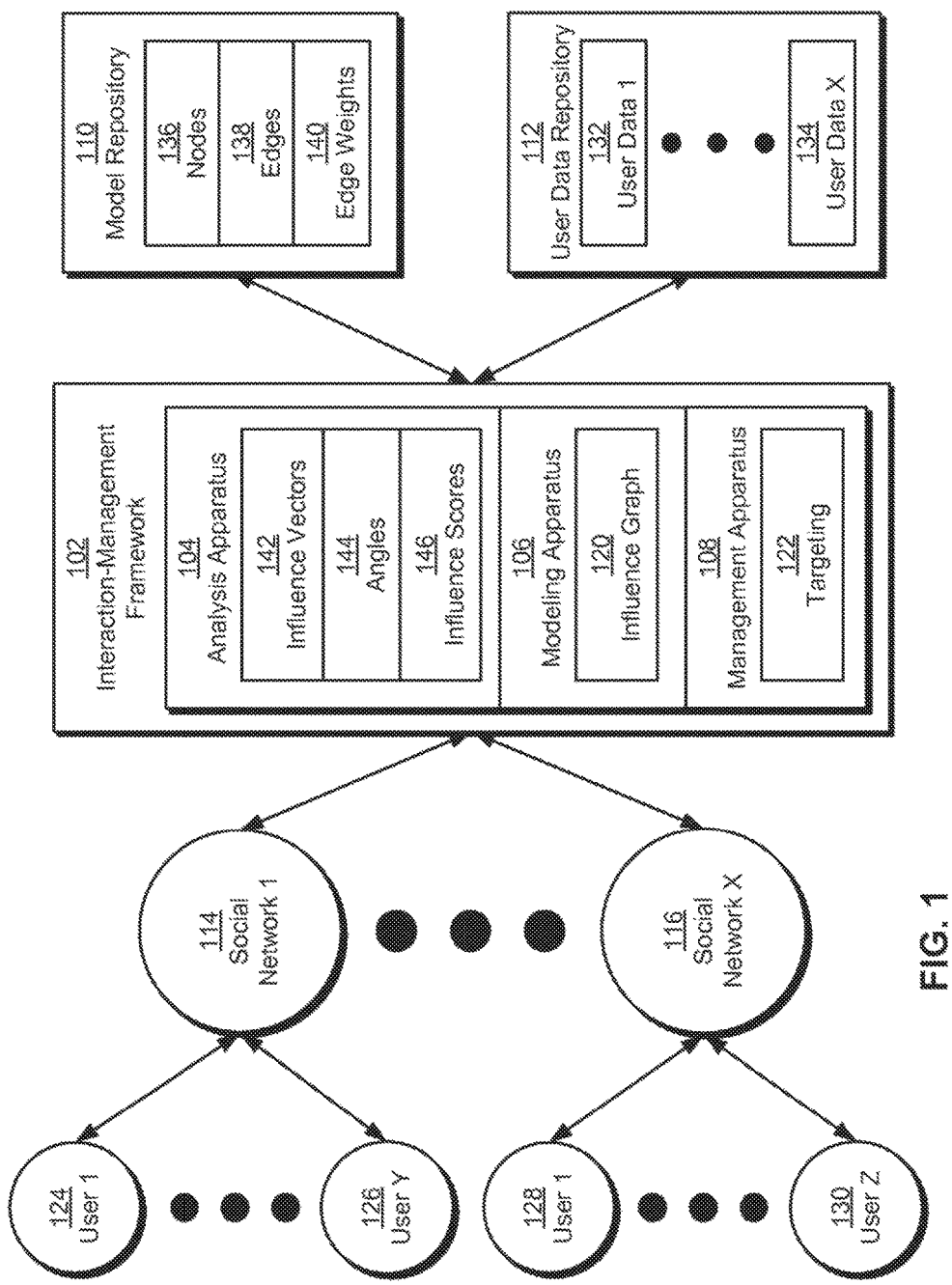
FIG. 1 shows a schematic of a system in accordance with the disclosed embodiments.

The disclosed embodiments provide a method and system for facilitating user interaction. More specifically, the disclosed embodiments provide a method and system for determining and leveraging user influence across social networks. As shown in FIG. 1, a set of users (e.g., user 1 124, user y 126, user 1 128, user z 130) may interact with one another through a set of social networks (e.g., social network 1 114, social network x 116). For example, a user may create user profiles on multiple web-based social networking services. The user may also add one or more friends, acquaintances, family members, professional connections, and/or other users with whom the user has a relationship as the user's contacts in the social networking services. The user may then interact with the other users by sharing posts, comments, likes, photos, videos, events, activities, articles, and/or messages with the other users.

Those skilled in the art will appreciate that different users may have different levels of influence within and/or across social networks. For example, a user who is considered a leader, thought leader, contributor, celebrity, intelligent, experienced, reputable, and/or well-connected may have a higher degree of influence than a user who occupies less of a leadership role, is less famous, contributes less, and/or is perceived to be less well-connected, intelligent, experienced, and/or reputable. In turn, highly influential users may be more effective at conveying ideas and/or messages across the social networks than less influential users.

In one or more embodiments, an interaction-management framework 102 includes functionality to determine influence across social networks and facilitate interaction among the users based on the determined influence. First, an analysis apparatus 104 may obtain user data (e.g., user data 1 132, user data x 134) for users in the social networks. For example, analysis apparatus 104 may use application-programming interfaces (APIs) with the social networks to obtain the user data from the social networks. Analysis apparatus 104 may also store the user data in a user data repository 112 for subsequent retrieval, update, and/or use.

Next, analysis apparatus 104 may calculate one or more influence scores 146 for each connected pair of users in a social network. Each influence score may represent the influence of one user on another user. As a result, influence scores 146 for a pair of users may include a first influence score representing a first level of influence of a first user in the pair on the second user in the pair, as well as a second influence score representing a second level of influence of the second user on the first user.

To calculate influence scores 146 for the pair of users, analysis apparatus 104 may create a set of influence vectors 142 for each user in the pair. Influence vectors 142 may include an activity vector that represents the user's level and type of activity within the social network, as well as a profile vector that represents the user's background and/or demographic information. For example, the activity vector may include shares, posts, comments, likes, tags, follows, and/or other social network activity by the user. The social network activity may also be related to a topic such as a sports team, a product, a service, a person, an academic subject, a place, an activity, and/or an event. On the other hand, the profile vector may include demographic and/or background information such as the user's age, location, ethnicity, language, education, occupation, and/or family status. After influence vectors 142 are created from user data for the user from user data repository 112, influence vectors 142 may be stored with the user data in user data repository 112 for subsequent retrieval and use.

Analysis apparatus 104 may also calculate a set of angles 144 between corresponding influence vectors 142 from the pair of users. For example, analysis apparatus 104 may calculate a first angle between the activity vectors of the users and a second angle between the profile vectors of the users. A smaller and/or positive angle may indicate a higher level of similarity and/or influence between the users, while a larger and/or negative angle may indicate a lower level of similarity and/or influence between the users.

Analysis apparatus 104 may then use angles 144 to calculate influence scores 146. In particular, analysis apparatus 104 may use a set of weights to normalize angles 144 and/or combine angles 144 into influence scores 146 representing different levels of influence between the users. A positive influence score may represent the ability of one user to influence another user, while a negative influence score may represent the user's lack of influence on the other user.

For example, the activity vector for a user may be represented by the following dimensions:

<likes, shares, comments, posts>

As mentioned above, the dimensions in the activity vector may be associated with a topic. In other words, the activity vector may represent the user's social network activity (e.g., likes, shares, comments, posts) with respect to the topic.

Moreover, the social network activity may be related to five interactions within a social network, represented as t1, t2, t3, t4, and t5.

Each dimension in the activity vector may also be associated with a set of weights. The user's lack of participation in a dimension may be given a weight of zero, while the user's participation in a dimension may be associated with a positive or negative weight, depending on the positivity or negativity associated with the user's participation. Because both likes and shares represent positive interactions, the user's like of the interaction may have a weight of 1, while the user's share of the interaction may have a higher weight of 5 because the user is more involved with and/or interested in the topic and/or interaction. On the other hand, comments and posts may have weights of 3 for positive participation (e.g., positive discussion of the topic) and weights of −3 for negative participation (e.g., negative discussion of the topic).

A pair of users may have a first user that has liked t1 and t3, shared t1, commented positively about t3, and posted positively about t3. The second user in the pair may have liked t1, t3, and t5; shared t1 and t5; and posted positively about t2. The first user may thus have the following activity vector:

$$1*like(t1)+0*like(t2)+1*like(t3)+0*like(t4)+0*like(t5)+$$

$$5*share(t1)+0*share(t2)+0*share(t3)+0*share(t4)+0*share(t5)+$$

$$0*comment(t1)+0*comment(t2)+3*comment(t3)+0*comment(t4)+$$

$$0*comment(t5)+$$

$$0*post(t1)+0*post(t2)+3*post(t3)+0*post(t4)+0*post(t5)$$

Similarly, the second user may have the following activity vector:

$$1*like(t1)+0*like(t2)+1*like(t3)+0*like(t4)+1*like(t5)+$$

$$5*share(t1)+0*share(t2)+0*share(t3)+0*share(t4)+5*share(t5)+$$

$$0*comment(t1)+0*comment(t2)+0*comment(t3)+0*comment(t4)+$$

$$0*comment(t5)+$$

$$0*post(t1)+3*post(t2)+0*post(t3)+0*post(t4)+0*post(t5)$$

The angle between the activity vectors of the users may indicate the similarity of the users' social network activities with respect to the topic. In addition, the angle may be calculated using the dot product of the activity vectors. More specifically, the angle's cosine may be the dot product of the activity vectors divided by the product of the magnitudes of the activity vectors:

$$(1+25)/(sqrt(1+1+25+9+9)*sqrt(1+1+25+25+9))=26/(sqrt(45)*sqrt(61))=0.496251$$

The angle may then be obtained as the arccosine of 0.496251, or 60.24 degrees.

Continuing with the example, the profile vector for a user may be represented by the following dimensions:

<{country, state, city}, ethnicity, languages known, university name, educational degree, workplace, profession, family status>

In addition, each dimension of the profile vector may be mapped to a numeric identifier. As a result, the profile vector for the first user may include the following:

<{1, 617, 2}, 3, 1, 3, 4, 23, 4, 5, 3, 2>

The dimensions of the first user's profile vector may correspond to the following:

Country—1 (e.g., United States)
State—617 (e.g., Massachusetts)
City—2 (e.g., Boston)
Ethnicity—3
Languages—1 (e.g., English), 3 (e.g., German), 4 (e.g., Italian)
University—23
Educational Degree—4 (e.g., PhD)
Workplace—5
Profession—3
Family Status—2 (e.g., Single)

The profile vector for the second user may include the following:

<{1, 857, 4}, 1, 4, 5, 3, 12, 4, 5, 4, 2>

Within the profile vectors, the first three dimensions representing location are placed in brackets. The bracketed numbers may be used to generate a unique identifier for a particular location, such as a combination of a city, state, and country.

As with the activity vectors, the angle of the profile vectors may be calculated using the dot product of the vectors. The angle may then be normalized using a set of factors, such as age and/or number of years of professional experience. More specifically, the differences in values associated with the factors may be combined with a set of weights to normalize the angle. If the first and second users have ages of 29 and 40 and two and 11 years of experience, respectively, the respective differences between the ages and years of professional experience may be −11 and −9 from the first user to the second user and 11 and 9 from the second user to the first user. The differences in age and years of professional experience may then be combined using weights of 0.8 and 0.2, respectively, to obtain the following normalization values:

$$0.8*age\_difference+0.2*professional\_experience\_difference$$

$$=-10.6 \text{ from the first user to the second user, and}$$

$$=10.6 \text{ from the second user to the first user.}$$

The weights may indicate that the age difference between the users affects the angles four times as much as the difference in years of professional experience. If the angle between the profile vectors is calculated to be 34.5 degrees, the angle may be normalized to be −365.7 and 365.7 for the first and second users, respectively.

In addition, the weights may be calculated using training data that includes both user data associated with dimensions of the activity and profile vectors and measured levels of influence between pairs of users. Such training data may be collected using surveying techniques and used to train a statistical model for calculating influence scores 146 from influence vectors 142 and angles 144.

After angles 144 between the activity and profile vectors are calculated, angles 144 may be combined with another set of weights into an influence score for each user in the pair. Influence scores 146 may also be normalized to have a maximum value of positive or negative 1. In particular, weights of 0.5 and 0.5 may be applied to the angles obtained above to produce the following influence scores 146:

0.5*60.24+0.5*(−365.7)=−152.73 for the first user, and 0.5*60.24+0.5*365.7=212.97 for the second user.

Influence scores 146 may then be normalized by a factor of 300 to produce the following normalized influence scores 146:

−152.73/300=−0.51 for the first user, and 212.97/300=0.71 for the second user.

Such influence scores 146 may indicate that the second user has a significant influence on the first user, while the first user has little to no influence on the second user.

As with the weights used in normalization of the angle between the profile vectors, the weights used to calculate influence scores 146 may represent the proportionate effects of angles 144 on influence scores 146. Such weights may also be obtained using training data, which may include activity data, profile data, and/or measurements of influence (e.g., user actions) associated with the activity and/or profile data. A logistic regression technique, support vector machine, stochastic gradient descent technique, random forest technique, and/or other learning technique may be used to train the statistical model and/or update the weights used in calculating influence scores 146.

After influence scores 146 are calculated for pairs of users from the social networks, a modeling apparatus 106 in interaction-management framework 102 may construct an influence graph 120 from influence scores 146. In particular, modeling apparatus 106 may create a first node in influence graph 120 that represents the first user in each pair and a second node in influence graph 120 that represents the second user in the pair. Modeling apparatus 106 may then use influence scores 146 between the users as edge weights of directed edges between the first and second nodes. For example, modeling apparatus 106 may use the influence score for the first user as the edge weight for a directed edge from the first node to the second node and the influence score for the second user as the edge weight for a directed edge from the second node to the first node.

Modeling apparatus 106 may also store influence graph 120 as a set of nodes 136, edges 138 between pairs of nodes 136, and edge weights 140 of individual edges 138 in a model repository 110. Influence graph 120 may thus model the relationships among the users, as well as the level of influence each user may have on every other user with whom that user has a relationship. Influence graph 120 is discussed in further detail below with respect to FIG. 2.

Finally, a management apparatus 108 in interaction-management framework 102 may use influence graph 120 to facilitate interaction among the users. More specifically, management apparatus 108 may identify a path through influence graph 120 and use the path in targeting 122 users on the path. For example, management apparatus 108 may use path-finding techniques such as Dijkstra's shortest path, max-flow min-cut, minimum spanning tree, and/or belief propagation to identify influence-based paths among the users. Management apparatus 108 may then use the paths to perform targeting 122 of influential users on the paths with goods, services, ideas, and/or topics. In turn, the users may relay the goods, services, ideas, and/or topics to other users on the paths, thus propagating targeting 122 to the other users. Analysis apparatus 104, modeling apparatus 106, and/or management apparatus 108 may also analyze influence scores 146 and/or influence graph 120 to identify attributes associated with influential users and/or patterns of influence across the users.

Because interaction-management framework 102 identifies influence-based connections in the social networks, interaction-management framework 102 may encourage user adoption of ideas and/or topics more efficiently and/or effectively than indiscriminate and/or random targeting 122 of users in the social networks may. Moreover, the creation and use of directional influence scores 146 between pairs of users in the social networks may allow interaction-management framework 102 to identify influence-based paths across the social networks and reach more users than techniques that perform user targeting based on measurements of influence for individual users.

Those skilled in the art will appreciate that the system of FIG. 1 may be implemented in a variety of ways. More specifically, analysis apparatus 104, modeling apparatus 106, management apparatus 108, model repository 110, and user data repository 112 may execute on the same system or on different systems. For example, analysis apparatus 104, modeling apparatus 106, management apparatus 108, model repository 110, and user data repository 112 may be provided by a single physical machine, multiple computer systems, one or more virtual machines, a grid, one or more databases (e.g., relational databases, graph databases, etc.), one or more filesystems, and/or a cloud computing system.

Figure 2:
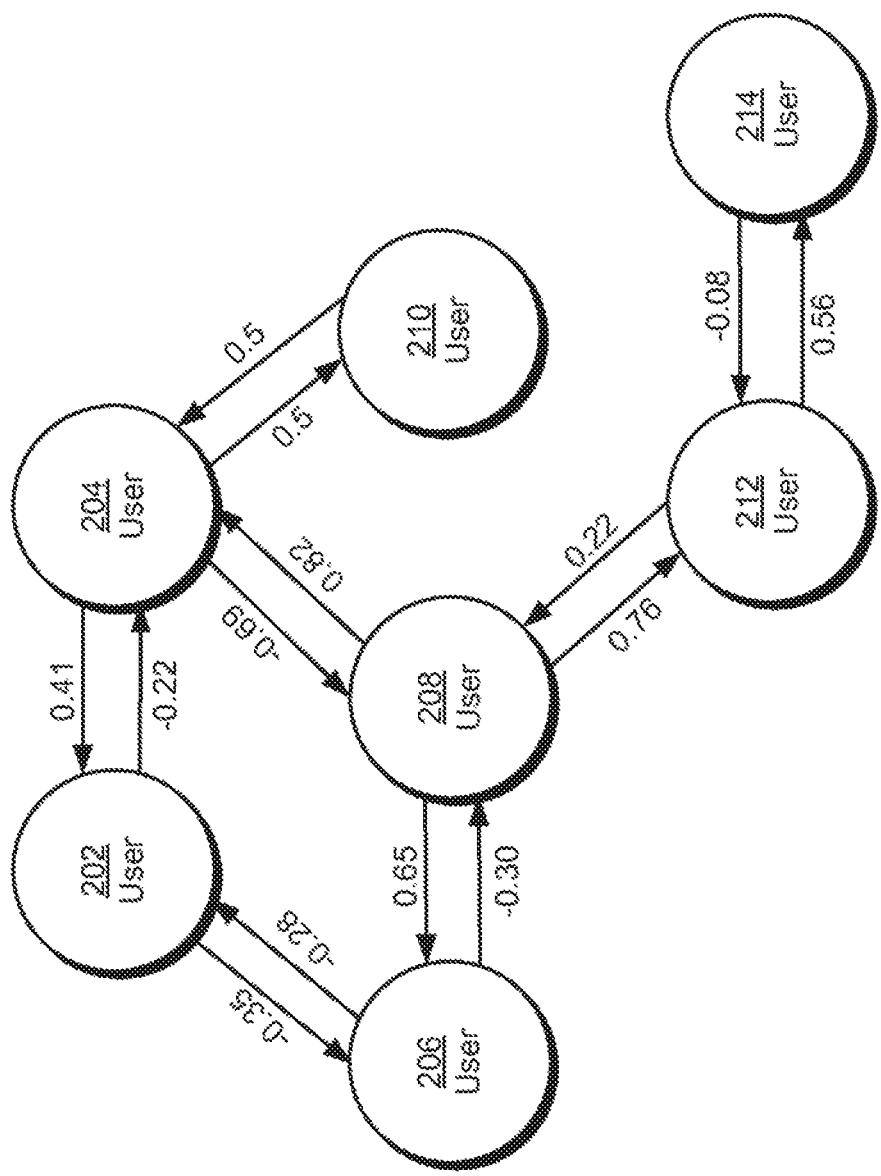
FIG. 2 shows an exemplary influence graph in accordance with the disclosed embodiments.

FIG. 2 shows an exemplary influence graph (e.g., influence graph 120 of FIG. 1) in accordance with the disclosed embodiments. As shown in FIG. 2, the influence graph includes a set of nodes representing users 202-214, as well as a set of directed edges representing relationships and/or levels of influence between pairs of users 202-214 in the influence graph.

Each directed edge may have an edge weight that represents the influence of the user corresponding to the tail of the directed edge on the user corresponding to the head of the directed edge. For example, user 202 may have directed edges to users 204 and 206 with edge weights of −0.22 and −0.35, respectively. User 204 may have directed edges to users 202, 208, and 210 with edge weights of 0.41, −0.69, and 0.5, respectively. User 206 may have directed edges to users 202 and 208 with edge weights of −0.28 and −0.30, respectively. User 208 may have directed edges to users 204, 206 and 212 with edge weights of 0.82, 0.65, and 0.76, respectively. User 210 may have a directed edge to user 204 with an edge weight of 0.5. User 212 may have directed edges to users 208 and 214 with edge weights of 0.22 and 0.56, respectively. User 214 may have a directed edge to user 212 with an edge weight of −0.08.

As mentioned above, edge weights of directed edges in the influence graph may correspond to influence scores (e.g., influence scores 146 of FIG. 1) between pairs of users 202-214 connected by the directed edges. The influence scores may be based on the similarities of connected users, in behavior and interests, as well as the users' backgrounds, which may be used to infer the users' relative reputations and/or levels of influence on one another. A higher edge weight may indicate a higher level of influence of a user on another user, while a lower edge weight may indicate a lower level of influence of the user on another user. For example, edge weights in the influence graph may indicate that users 204, 208, 210, and 212 have relatively high levels of influence, while users 202, 206, and 214 have relatively low levels of influence.

The edge weights may then be used to identify a path through the influence graph, which in turn may be used to target users 202-214 and/or facilitate the positive discussion and/or promotion of goods, services, and/or ideas among users 202-214. For example, users 202-214 may be exposed to a topic by targeting user 208 with sponsored content, an event, and/or a promotion containing the topic. The relatively high level of influence of user 208 on other users 204, 206 and 212 to whom user 208 is connected may encourage the discussion and/or use of the topic by the other users. Within the other users, user 204 may have enough influence on users 202 and 210 to spread the topic effectively to users 202 and 210. Similarly, user 212 may have enough influence on user 214 to spread the topic to user 214.

Consequently, the influence graph may increase the effectiveness and/or efficiency of user targeting by entities (e.g., companies, organizations, other users, etc.) performing the targeting. For example, the influence graph may enable the propagation of a topic across the entire set of users 202-214 through the targeting of a single user 208. On the other hand, conventional user targeting techniques that do not consider relationships and/or levels of influence between individual pairs of users 202-214 may target multiple users (e.g., first user 204, then user 212) to attain the same reach across the entire set of users 202-214.

Figure 3:
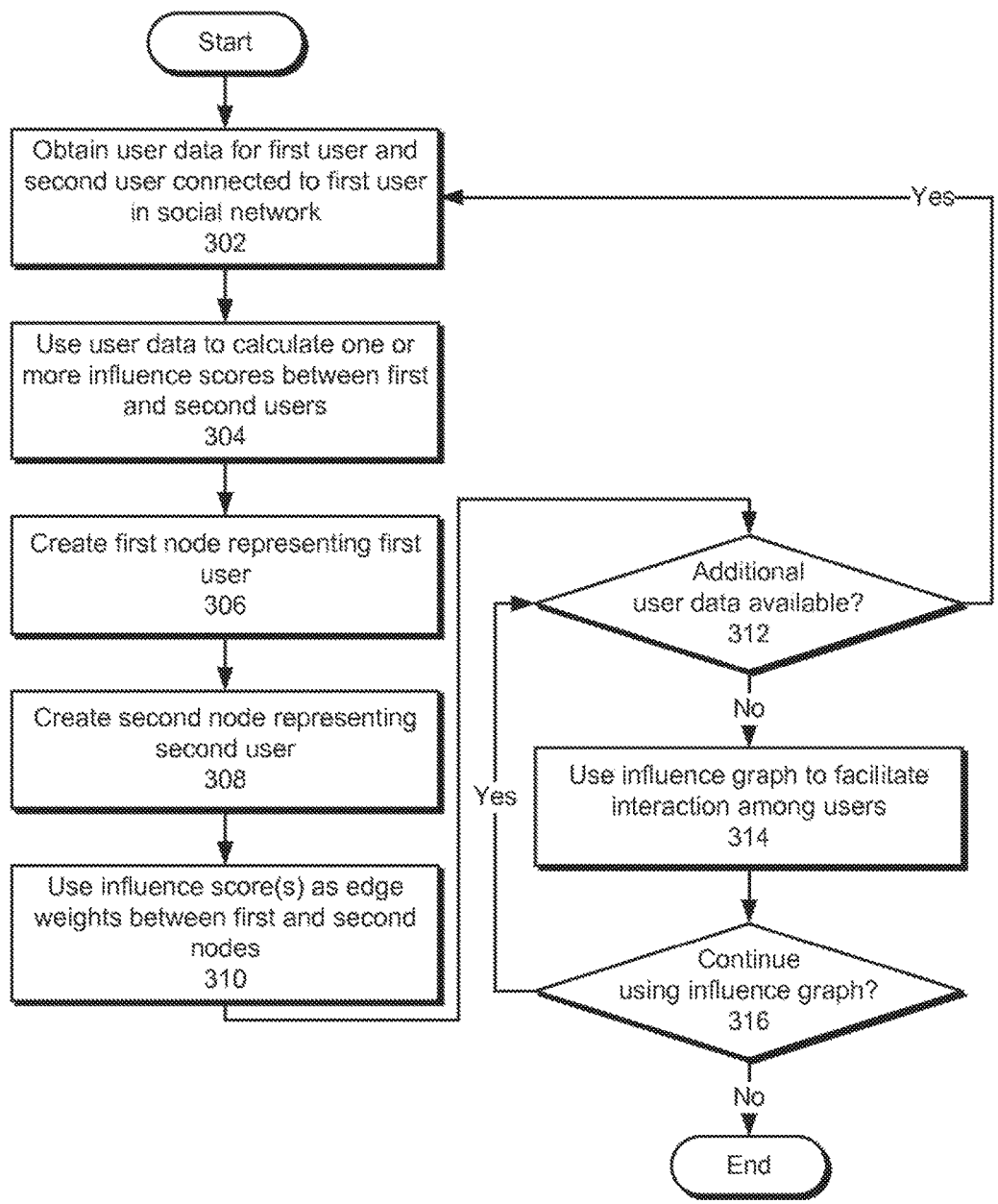
FIG. 3 shows a flowchart illustrating the process of facilitating user interaction in accordance with the disclosed embodiments.

FIG. 3 shows a flowchart illustrating the process of facilitating user interaction in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, user data for a first user and a second user connected to the first user in a social network is obtained (operation 302). The user data may include profile (e.g., demographic, background) data for the users, as well as data associated with the users' behavior (e.g., posts, likes, comments, shares, follows, tags, topics, etc.) on the social network. Next, the user data is used to calculate one or more influence scores between the first and second users (operation 304). The influence scores may include a first influence score representing a first level of influence of the first user on the second user, as well as a second influence score representing a second level of influence of the second user on the first user. Calculation of influence scores between pairs of users is discussed in further detail below with respect to FIG. 4.

An influence graph of the users is also constructed. In particular, a first node representing the first user is created (operation 306), and a second node representing the second user is created (operation 308). Next, the influence score(s) are used as edge weights of directed edges between the first and second nodes (operation 310). For example, the edge weight of the directed edge from the first node to the second node may be set to the influence score of the first user on the second user. Similarly, the edge weight of the directed edge from the second node to the first node may be set to the influence score of the second user on the first user.

Additional user data may be available (operation 312) for other users in the social network and/or other social networks. If the user data is available, the user data is obtained for each connected pair of users in a social network (operation 302), influence scores are calculated using the user data (operation 304), and the influence graph is updated with nodes representing the users and edge weights representing the users' respective influence scores (operations 306-310).

After the influence graph is populated with users and influence scores, the influence graph is used to facilitate interaction among the users (operation 314). For example, a path through the influence graph may be identified using a path-finding technique such as Dijkstra's shortest path, max-flow min-cut, minimum spanning tree, and/or belief propagation. The path may also be used to target one or more users on the path. The targeted users may have relatively high levels of influence on other users and spread the topic with which the users are targeted to the other users. In turn, some or all of the other users may exert relatively high levels of influence and propagate the topic to another set of users, thus allowing the topic to reach most or all of the users on the path.

The influence graph may continue to be used (operation 316) to facilitate interaction and/or propagate ideas and/or messages among the users. If the influence graph is to be used, the influence graph may periodically be updated with additional user data (operation 312). The additional user data may be related to new users in the social networks and/or existing users in the social networks and influence graph. For example, additional user data may be available when a user joins a social network and/or when an existing user in a social network updates his/her profile or performs an action on the social network. The additional user data may also reflect trends and/or the spreading of topics in the social network. The user data may be used to update the influence graph (operation 302-310), and the influence graph may be used to facilitate interaction among the users (operation 314). The influence graph may thus continue to be used (operation 316) until targeting of the users ceases and/or levels of influence across the social networks are no longer assessed.

Figure 4:
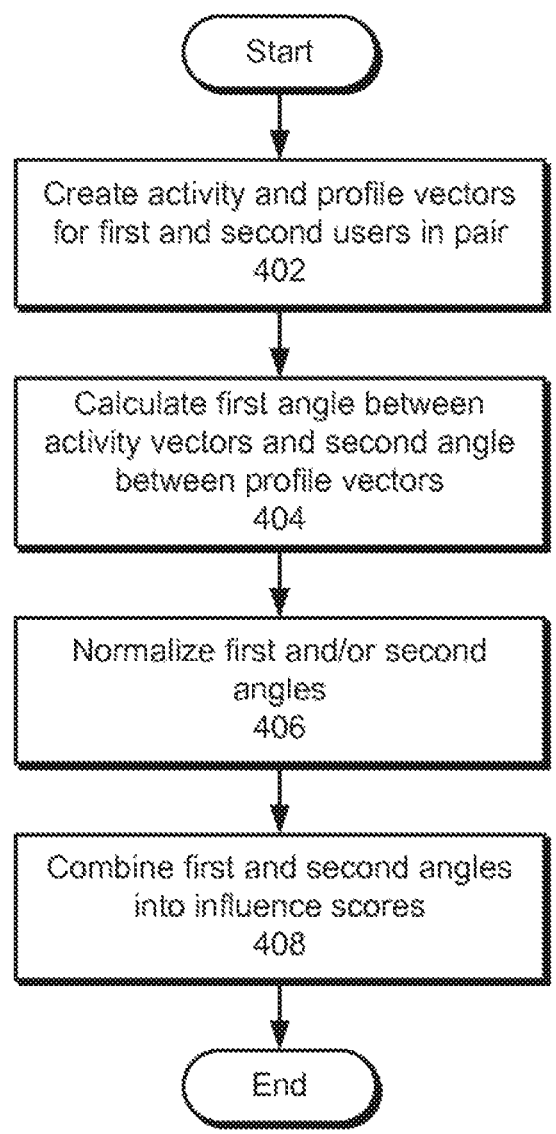
FIG. 4 shows a flowchart illustrating the process of calculating a set of influence scores between a pair of users in accordance with the disclosed embodiments.

FIG. 4 shows a flowchart illustrating the process of calculating a set of influence scores between a pair of users in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, activity and profile vectors are created for the first and second users in the pair (operation 402). For example, an activity vector and a profile vector may be created for each user in the pair. The activity vector may include dimensions associated with topics, shares, posts, comments, tags, follows, likes, and/or other user activities in a social network. In addition, the activity vector for a user may include measurements of the user's actions in the social network, as well as measurements of actions of other users that may be related to the user's actions (e.g., likes, comments, or re-posts associated with the user's posts). The profile vector may include dimensions associated with age, location, ethnicity, language, education, occupation, family status, and/or other background or demographic information for the users.

Next, a first angle between the activity vectors and a second angle between the profile vectors are calculated (operation 404). Each angle may be calculated by obtaining the dot product of the corresponding vectors, dividing the dot product by the product of the magnitudes of the vectors to obtain the cosine of the angle, and then calculating the arccosine of the cosine. Smaller and/or positive angles may represent higher levels of similarity and/or influence between the users, while larger and/or negative angles may represent lower levels of similarity and/or influence between the users.

The first and/or second angles may also be normalized (operation 406). For example, the angles may be normalized using a set of factors and/or a set of weights to have values of no more than 1 and no less than −1. The factors and/or weights may also be used to adjust the level of influence each user in the pair may have on the other user in the pair.

Finally, the first and second angles are combined into the influence scores (operation 408). As with normalization of the angles, a set of weights may be used to combine the angles into the influence scores and/or adjust the relative effect of each type of influence vector (e.g., profile vector, activity vector) on the influence scores. The weights may be included in a statistical model that is trained using training data, which may contain both user data and measurements of influence related to the user data. The weights may also be updated as measurements of influence between the users in the pair are obtained and used to verify the accuracy of the users' influence scores. Similarly, the influence scores may be updated as the users' respective levels of influence on one another change with the users' behaviors and/or backgrounds.

Figure 5:
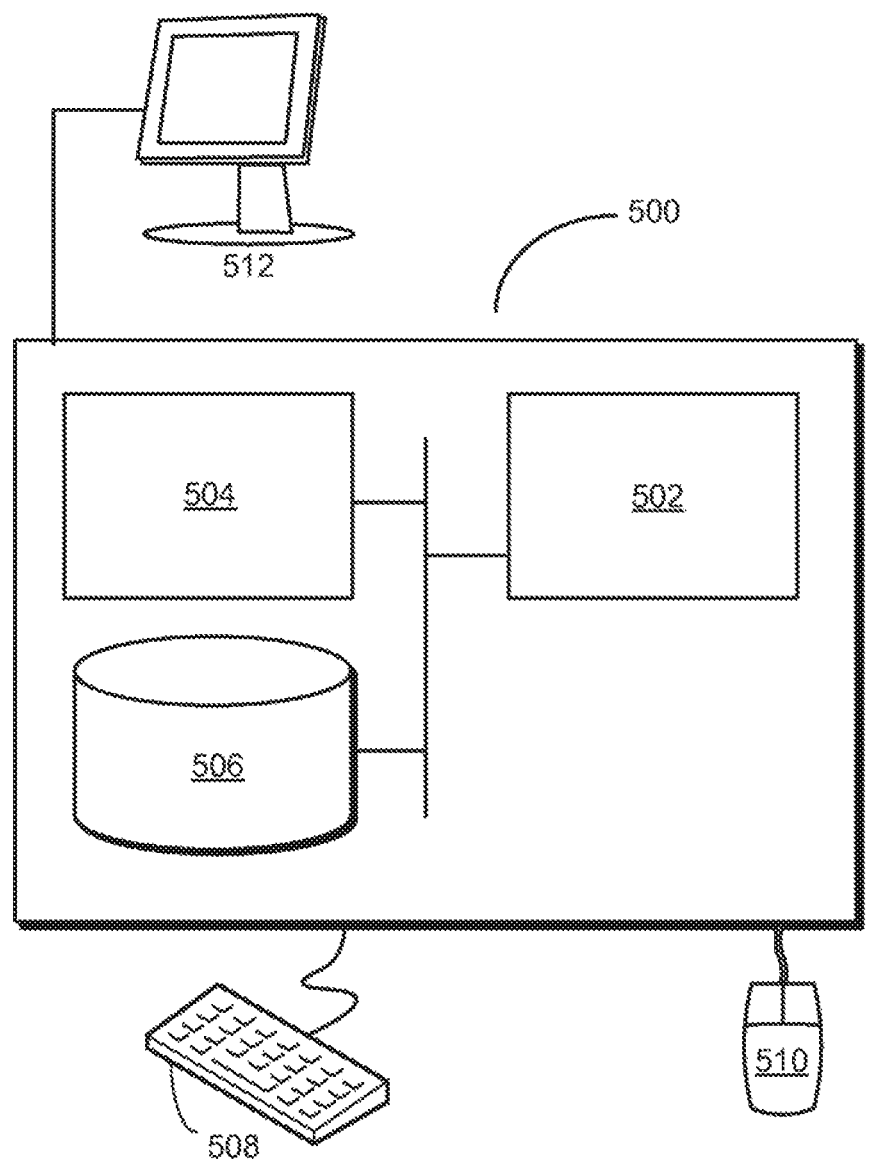
FIG. 5 shows a computer system in accordance with the disclosed embodiments.

FIG. 5 shows a computer system 500. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating user interaction. The system may include an analysis apparatus that obtains user data for a first user and a second user connected to the first user in a social network and uses the user data to calculate one or more influence scores between the first and second users. The system may also include a modeling apparatus that constructs an influence graph of a set of users comprising the first and second users. To construct the influence graph, the modeling apparatus may create a first node representing the first user and a second node representing the second user. The modeling apparatus may then use the one or more influence scores as edge weights of directed edges between the first and second nodes. Finally, the system may include a management apparatus that uses the influence graph to facilitate interaction among the users.

In addition, one or more components of computer system 500 may be remotely located and connected to the other components over a network. Portions of the present embodiments (e.g., analysis apparatus, modeling apparatus, management apparatus, etc.) may also be located on different nodes of a distributed system that implements the embodiments. For example, the present embodiments may be implemented using a cloud computing system that determines influence across social networks of remote users and uses the influence to facilitate interaction and/or propagation of information among the users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for determining user influence across an online social network, comprising:
   obtaining, via a processor, user data for at least a first user and a second user in a plurality of users of a social network;
   determining a first influence score representing a measure of influence of the first user on the second user, and a second influence score representing a measure of influence of the second user on the first user by generating, from the user data, a first influence vector for the first user and a second influence vector for the second user, wherein each of the first and second influence vectors is based on a profile vector characterizing a user on the social network and on an activity vector describing a type of activity performed by the user on the social network;
   building an influence graph of the plurality of users, wherein at least a first node and a second node in the influence graph correspond to the first user and the second user, respectively, and wherein edges connecting the first node and the second node correspond to the first influence score and the second influence score;
   identifying a path through the influence graph, the path having one or more of the plurality of users; and
   sending targeted data to the one or more users in the path.

2. A computer-readable storage medium storing instructions, which, when executed on a processor, performs an operation for determining user influence across an online social network, the operation comprising:
   obtaining, via the processor, user data for at least a first user and a second user in a plurality of users of a social network;
   determining a first influence score representing a measure of influence of the first user on the second user, and a second influence score representing a measure of influence of the second user on the first user by generating, from the user data, a first influence vector for the first user and a second influence vector for the second user, wherein each of the first and second influence vectors is based on a profile vector characterizing a user on the social network and on an activity vector describing a type of activity performed by the user on the social network;
   building an influence graph of the plurality of users, wherein at least a first node and a second node in the influence graph correspond to the first user and the second user, respectively, and wherein edges connecting the first node and the second node correspond to the first influence score and the second influence score;
   identifying a path through the influence graph, the path having one or more of the plurality of users; and
   sending targeted data to the one or more users in the path.

3. A system, comprising:
   a processor; and
   a memory storing program code, which, when executed on the processor, performs an operation for determining user influence across an online social network, the operation comprising:
      obtaining, via the processor, user data for at least a first user and a second user in a plurality of users of a social network,
      determining a first influence score representing a measure of influence of the first user on the second user, and a second influence score representing a measure of influence of the second user on the first user by generating, from the user data, a first influence vector for the first user and a second influence vector for the second user, wherein each of the first and second influence vectors is based on a profile vector characterizing a user on the social network and on an activity vector describing a type of activity performed by the user on the social network, building an influence graph of the plurality of users, wherein at least a first node and a second node in the influence graph correspond to the first user and the second user, respectively, and wherein edges connecting the first node and the second node correspond to the first influence score and the second influence score, identifying a path through the influence graph, the path having one or more of the plurality of users, and sending targeted data to the one or more users in the path.

4. The method of claim 1, wherein determining the first influence score and the second influence score further comprises:

determining an angle between the first influence vector and the second influence vector; and determining the first influence score and the second influence score based on the angle.

5. The method of claim 1, wherein the path is determined based on weights of edges connecting nodes each corresponding to one of the one or more of the plurality of users.

6. The method of claim 1, further comprising:

obtaining additional user data associated with the at least the first and second users; and updating the influence graph based on the additional user data.

7. The method of claim 1, wherein the one or more users in the path are associated with an influence score that exceeds a threshold.

8. The method of claim 1, wherein the one or more users in the path are associated with an influence score that exceeds a threshold.

9. The computer-readable storage medium of claim 2, wherein determining the first influence score and the second influence score further comprises:

determining an angle between the first influence vector and the second influence vector; and determining the first influence score and the second influence score based on the angle.

10. The computer-readable storage medium of claim 2, wherein the path is determined based on weights of edges connecting nodes each corresponding to one of the one or more of the plurality of users.

11. The computer-readable storage medium of claim 2, wherein the operation further comprises:

obtaining additional user data associated with the at least the first and second users; and updating the influence graph based on the additional user data.

12. The system of claim 3, wherein determining the first influence score and the second influence score further comprises:

determining an angle between the first influence vector and the second influence vector; and determining the first influence score and the second influence score based on the angle.

13. The system of claim 3, wherein the path is determined based on weights of edges connecting nodes each corresponding to one of the one or more of the plurality of users.

14. The system of claim 3, wherein the operation further comprises:

obtaining additional user data associated with the at least the first and second users; and updating the influence graph based on the additional user data.

15. The method of claim 5, wherein the weights are determined based on training data of user data collected in the social network.

16. The computer-readable storage medium of claim 10, wherein the weights are determined based on training data of user data collected in the social network.

17. The system of claim 13, wherein the weights are determined based on training data of user data collected in the social network.

* * * * *